US007390567B2

(12) United States Patent
Matsukawa et al.

(10) Patent No.: US 7,390,567 B2
(45) Date of Patent: Jun. 24, 2008

(54) SOFT MAGNETIC COMPOSITE POWDER COMPRISING AN INORGANIC INSULATING COATING, PRODUCTION METHOD OF THE SAME, AND PRODUCTION METHOD OF SOFT MAGNETIC COMPACT

(75) Inventors: Kiyotaka Matsukawa, Neyagawa (JP); Kozo Ishihara, Neyagawa (JP); Ikuo Uemoto, Neyagawa (JP); Masafumi Taniguchi, Neyagawa (JP)

(73) Assignee: Nippon Kagaku Yakin Co., Ltd., Osaka (JP)

( * ) Notice: Subject to any disclaimer, the term of this patent is extended or adjusted under 35 U.S.C. 154(b) by 0 days.

(21) Appl. No.: 10/567,336

(22) PCT Filed: Apr. 22, 2004

(86) PCT No.: PCT/JP2004/005772

§ 371 (c)(1), (2), (4) Date: Mar. 29, 2006

(87) PCT Pub. No.: WO2005/015581

PCT Pub. Date: Feb. 17, 2005

(65) Prior Publication Data

US 2006/0165985 A1 Jul. 27, 2006

(30) Foreign Application Priority Data

Aug. 6, 2003 (JP) ............................. 2003-287975

(51) Int. Cl.
*B32B 5/16* (2006.01)

(52) U.S. Cl. ......................... 428/403; 148/105; 428/407

(58) Field of Classification Search ................. 428/403, 428/407; 148/105
See application file for complete search history.

(56) References Cited

U.S. PATENT DOCUMENTS

| | | | | |
|---|---|---|---|---|
| 4,601,753 | A | 7/1986 | Soileau et al. | |
| 5,120,366 | A * | 6/1992 | Harada et al. | 106/486 |
| 5,798,439 | A * | 8/1998 | Lefebvre et al. | 528/489 |
| 6,368,423 | B1 | 4/2002 | Otsuka et al. | |
| 6,485,579 | B1 * | 11/2002 | Nillius et al. | 148/104 |
| 7,033,413 | B2 * | 4/2006 | Iyoda et al. | 75/252 |
| 7,175,717 | B2 * | 2/2007 | Song et al. | 148/104 |

FOREIGN PATENT DOCUMENTS

| | | |
|---|---|---|
| JP | 60-1816 | 1/1985 |
| JP | 63-158810 | 7/1988 |
| JP | 4-33301 | 2/1992 |
| JP | 6-260319 | 9/1994 |

(Continued)

*Primary Examiner*—H. T Le
(74) *Attorney, Agent, or Firm*—Wenderoth, Lind & Ponack, L.L.P.

(57) ABSTRACT

A soft magnetic compact which is produced by using soft magnetic composite powder in which the surface of magnetic powder is covered with an electrical insulating material containing at least an inorganic insulating material, and a resin material is fusion-bonded to the surface of the inorganic insulating material so as to partially cover the surface of the soft magnetic powder. Accordingly, it is possible to ensure an electrical insulating property between pieces of soft magnetic material powder to secure a good magnetic characteristics and to easily mold a compact.

18 Claims, 1 Drawing Sheet

FOREIGN PATENT DOCUMENTS

| | | | |
|---|---|---|---|
| JP | 10-147832 | | 6/1998 |
| JP | 11-31612 | | 2/1999 |
| JP | 11-256202 | * | 9/1999 |
| JP | 2001-73062 | | 3/2001 |
| JP | 2004-143554 | | 5/2004 |

* cited by examiner

SOFT MAGNETIC COMPOSITE POWDER COMPRISING AN INORGANIC INSULATING COATING, PRODUCTION METHOD OF THE SAME, AND PRODUCTION METHOD OF SOFT MAGNETIC COMPACT

FIELD OF THE INVENTION

The invention relates to a soft magnetic composite powder, its production method, and a production method of a soft magnetic compact using the soft magnetic composite powder.

BACKGROUND ART

As a soft magnetic material to be used for a magnetic core of a transformer and choke coil for high frequency, and the like have been used carbonyl iron, ferrites, Sendust, and amorphous alloys. In the case of using these soft magnetic materials for a magnetic core, to increase the electric resistance in a high frequency region, a method of producing a soft magnetic compact by solidifying a powder of a soft magnetic material through an electrical insulating layer has been employed. For example, a method of obtaining a compacted powder by powder compaction molding using a low melting point glass as a binder for a soft magnetic material (see Japanese Laid-Open Patent Publication No. 63-158810) and a method of obtaining a fired body by compacting a powder using a low melting point glass and a resin as binders and burning only the resin (see Japanese Laid-Open Patent Publication No. 2001-73062) are proposed and also is proposed a method of obtaining an injection molded body by molding a resin composition containing a soft magnetic material by injection molding (see Japanese Laid-Open Patent Publication NO. 11-31612).

DISCLOSURE OF THE INVENTION

However, if low melting point glass is used as a binder, although the electric insulation property is easy to be assured among particles of a soft magnetic material powder, since both of the soft magnetic material and the glass are hard materials, high pressing pressure is required at the time of powder compaction molding. Therefore, there is a problem that a large scale press apparatus is required and the service life of a die is short to result in high production cost.

Further, in the case of molding a resin composition, it becomes inevitable that a large quantity of a resin is added to ensure the electric insulation property among particles of the soft magnetic material powder and it results in a problem that the magnetic property is deteriorated.

The aim of the present invention is to solve the above-mentioned problems and provide a production method of a soft magnetic compact which can be molded easily while ensuring an electric insulation property among particles of a soft magnetic material powder and ensuring good magnetic properties.

To solve the above-mentioned problems, inventors of the present invention gave attention to improvement of compaction processibility and ensured electric insulation property among particles of the soft magnetic material powder which are made possible by using a composite powder obtained by covering at least a portion of the surface of the soft magnetic material powder with an inorganic insulating material and fusing a resin material to the surface of the inorganic insulating material and thus have accomplished the present invention.

That is, a soft magnetic composite powder of the present invention is a composite powder used for producing a soft magnetic compact and is characterized in that the surface of the soft magnetic material powder is covered with an electrical insulating material containing at least an inorganic insulating material and a resin material is fusion-bonded to the surface of the inorganic insulating material so as to partially cover the surface of the soft magnetic material powder.

Further, by employing an inorganic insulating material as the above-mentioned electrical insulating material, a composite powder composed of a soft magnetic material powder whose surface is covered with an inorganic insulating layer comprising the inorganic insulating material and a resin material fusion-bonded to the inorganic insulating layer may be used. The electric insulation property among particles of the soft magnetic material powder can further be improved by covering the soft magnetic material powder with the inorganic insulating layer.

Further, in addition to an inorganic insulating material, a resin material may be used as the above-mentioned electrical insulating material. The processibility at the time of compaction can be improved by using the resin material.

Also, a glass material may be used as the above-mentioned inorganic insulating material. Since the glass material has a softening point, the particles of the composite powder can be bonded easily with one another by heating.

An amorphous soft magnetic alloy may be used as the soft magnetic material powder. This is because a soft magnetic compact having a high magnetic permeability and excellent in properties such as corrosion resistance and strength can be obtained.

Further, the composite powder is preferably granulated. This is because the granulated composite powder has a high filling density and high deformability.

The soft magnetic composite powder of the present invention is produced, for example, by a method as described below. That is, the production method is a method for producing a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder and involving steps of covering the soft magnetic material powder with the electrical insulating material, mixing the soft magnetic material powder with the resin material, and fusing the resin material to the inorganic insulating material.

Further, a glass material may be used for the above-mentioned inorganic insulating material and the glass material is fusion-bonded to the surface of the soft magnetic material powder to form a glass layer and the resin material may be fusion-bonded to the glass layer. Furthermore, low melting point glass may be used as the glass material.

Further, another production method of the soft magnetic composite powder of the invention is a method for producing a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder and involving steps of mixing the soft magnetic material powder, the inorganic insulating material and the resin material, covering the surface of the soft magnetic material powder with the inorganic insulating material and the resin material and fusing the resin material to the inorganic insulating material.

Using the soft magnetic composite powder of the present invention, a soft magnetic compact can be produced, for example, by a method described below. That is, the soft magnetic compact can be produced by filling a die with a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder, pressurizing the powder for obtaining a pressurized powder, and firing the pressurized powder for obtaining a fired body.

Further, another production method of the soft magnetic compact is characterized in that the soft magnetic compact is produced by further adding a resin material to a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder, kneading the mixture, and obtaining an injection-molded body of the kneaded mixture.

Also, another production method of the soft magnetic compact is characterized in that the soft magnetic compact is produced by further adding a resin material to a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder, kneading the mixture, obtaining an injection-molded body of the kneaded mixture, and degreasing and firing the injection-molded body for obtaining a fired body.

The soft magnetic composite powder of the present invention comprises a soft magnetic material whose surface is covered with an electrical insulating material containing at least an inorganic insulating material and a resin material fusion-bonded to the surface of the inorganic insulating material. Accordingly, in the case of pressurizing and molding the composite powder, the particles of the soft magnetic material powder can be prevented from contacting directly with one another, the friction among the particles of the soft magnetic material powder is lessened and therefore, the press pressure can be decreased. Particularly, since the resin material partially covers the surface of the soft magnetic material powder, the resin material can rather be freely deformed as compared with the case where the surface of the soft magnetic material powder is covered entirely. That is, the resin material is freely deformable on the point fusion-bonded to the inorganic insulating material as a supporting point and if the particles of the soft magnetic material powder come close to one another, the particles of the soft magnetic material brought into contact with the resin material change the moving direction owing to the deformation of the resin material and are enabled to move to the voids among the powder particles. Particularly, since the fine particles of the soft magnetic material powder move easily, the fine particles can be extruded to the voids formed among coarse particles of the soft magnetic material powder owing to the deformation of the resin material and accordingly it is made possible to increase the packing density. On the other hand, in the case where the surface of the soft magnetic material powder is entirely covered with the resin material, the resin material is allowed to deform in the film thickness direction but is suppressed to deform in the film width direction and thus the movement of the soft magnetic material powder is suppressed to make it difficult to increase the packing density. Further, since the resin material is fusion-bonded to the inorganic insulating material, the resin material can not be isolated easily from the inorganic insulating material and the particles of the soft magnetic material powder can be prevented from contacting with one another even when the resin material is deformed. Further, since the surface of the soft magnetic material powder is covered with the electrical insulating material containing the inorganic insulating material, the electric insulation property among particles of the soft magnetic material can be ensured by suppressing the direct contact among the particles of the soft magnetic material powder in the compact bodies such as a fired body and an injection-molded body. Herein, the fact that the surface of the soft magnetic material powder is partially covered means the state other than the state that the surface of the soft magnetic material powder is entirely covered and means the state that there is a portion in the surface where the resin material fusion-bonded to the inorganic insulating material is absent.

BEST MODE FOR CARRYING OUT THE INVENTION

Figure 1:
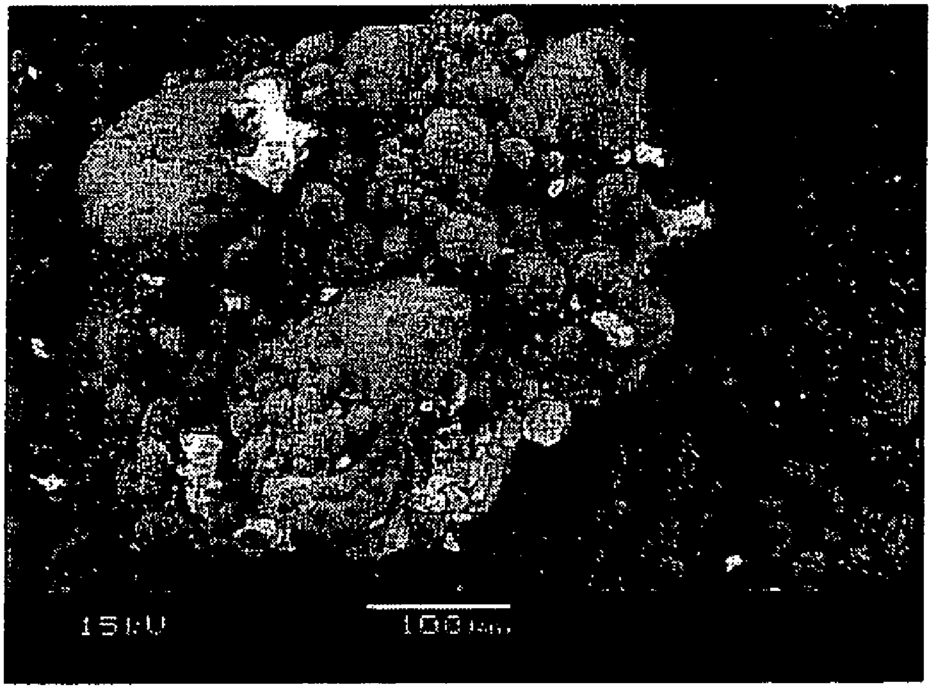
FIG. 1 is a SEM photograph showing the shape of one example of a soft magnetic composite powder of the present invention.

Hereinafter, preferred embodiments of the present invention will be specifically described below.

Embodiment 1

In this embodiment of the present invention, one production method of a composite powder using an inorganic insulating material for an electrical insulating material for covering the surface of a soft magnetic material powder will be described.

The soft magnetic material to be used for the embodiment includes metal oxide type material such as ferrites, carbonyl iron, Fe—Si alloys, Ni—Fe alloys, and metal type materials such as Fe-based or Co-based amorphous alloys. It is preferable to use soft magnetic type amorphous alloys which are excellent in corrosion resistance, wear resistance, strength, and soft magnetic properties such as high magnetic permeability and low coercive force as compared with those of crystal type materials. The soft magnetic amorphous alloys are not particularly limited and conventionally known iron-based and cobalt-based amorphous alloys can be used.

Examples of the inorganic insulating material to be used for the embodiment may include electrical insulating oxide of metals or semi-metals such as $Al_2O_3$, $SiO_2$, $Y_2O_3$, MgO, and $ZrO_2$ and glass materials and their mixtures and glass materials are preferable. Among glass materials are preferable low melting point glass materials. It is because they have a low softening temperature and are fusion-bonded to a soft magnetic amorphous alloy to cover the surface of the alloy.

The low melting point glass is not particularly limited if it is not reacted with the soft magnetic material powder and is softened at a temperature lower than the crystallization starting temperature of the soft magnetic amorphous alloy, preferably about 550° C. or lower. Examples of the glass is conventionally known low melting point glass such as lead type glass such as PbO—$B_2O_3$ type glass, $P_2O_5$ type glass, ZnO—

BaO type glass, and ZnO—$B_2O_3$—$SiO_2$ type glass. It is preferably $P_2O_5$ type glass, which is lead-free glass and giving a low softening point. Examples of such glass to be used include those having a composition comprising $P_2O_5$ 60 to 80%, $Al_2O_3$ 10% or less, ZnO 10 to 20%, $Li_2O$ 10% or less, and $Na_2O$ 10% or less.

The resin used for the present invention may include conventionally known thermoplastic resins or thermosetting resins. Examples of the thermoplastic resins include polyolefins such as polyethylenes and polypropylenes; polyvinyl alcohols, polyethylene oxides, polyphenylene sulfides (PPS), liquid crystal polymers, polyether ether ketones (PEEK), polyimides, polyether imides, polyacetals, polyether sulfones, polysulfones, polycarbonates, poly(ethylene terephthalate), poly(butylene terephthalate), polyphenylene oxides, polyphthalamides, polyamides, and their mixtures and copolymers. Examples of the thermosetting resins include phenol resins, epoxy resins, unsaturated polyester resins, diallyl phthalate resins, melamine resins, urea resins, and their mixture.

The shape of the resin material may be powder or fibrous, and powder type resin material which can be mixed easily is preferable.

Hereinafter, one example of production methods of the composite powder will be described. That is, an inorganic insulating layer is formed by previously covering the surface of the soft magnetic material powder with the inorganic insulating material and then fusing the resin material on the inorganic insulating layer.

A method applicable for forming the inorganic insulating layer by previously covering the soft magnetic material powder with the inorganic insulating material may be a powder coating method such as mechano-fusion, a wet thin film formation method such as electroless plating and sol-gel method, and a dry thin film formation such as sputtering. The powder coating method can be carried out, for example, using a powder coating apparatus described in Japanese Laid-Open Patent Publication No. 2001-73062. According to the method, the soft magnetic material powder and a low melting point glass powder receive high compressive friction force and fusion of the soft magnetic material powder and the low melting point glass powder and also bonding among particles of the glass powder are caused to obtain a composite powder containing the soft magnetic material powder whose surface is covered with the inorganic insulating layer of the low melting point glass.

Next, a resin powder is added to and mixed with the soft magnetic material powder having the inorganic insulating layer. The resin powder is partially melted by mechanical energy at the time of mixing and the melted portion is fusion-bonded to the inorganic insulating layer. Accordingly, the soft magnetic composite powder can be obtained. A conventionally known solid phase mixing method by a ball mill or the like may be employed for the mixing. The temperature at the time of mixing is a room temperature or higher and it is preferable to heat the powder at lowest the softening temperature of the resin material. It is because the melt fusion of the resin powder to the inorganic insulating layer is promoted.

Herein, in the case of using the soft magnetic material powder coated with the inorganic insulating layer, the particle diameter of the resin powder is smaller than that of the soft magnetic material powder and preferably a half or smaller and for example, in the case the particle diameter of the soft magnetic material powder is less than or equal to 300 μm, 150 μm or 45 μm, the particle diameter is preferably less than or equal to 150 μm, 75 μm or 20 μm, respectively.

The composition of the composite powder is required to contain 0.3 to 6% by weight of the inorganic insulating material, 1 to 10% by weight of the resin material, and the balance of the soft magnetic material powder; more preferably 0.4 to 3% by weight of the inorganic insulating material, 2 to 8% by weight of the resin material, and the balance of the soft magnetic material powder; and even more preferably 0.4 to 1% by weight of the inorganic insulating material, 3 to 8% by weight of the resin material, and the balance of the soft magnetic material powder. If necessary, 0.1 to 0.5% by weight of a lubricant may be added.

Also, if necessary, steric acid salts such as zinc stearate and calcium stearate may be added as the lubricant.

The composite powder of the embodiment of the present invention may be packed in a prescribed die and molded by a variety of molding methods such as powder compaction molding, injection molding, and extrusion molding. For example, in the case of powder compaction molding, the soft magnetic composite powder can be packed in a die and press molded by a prescribed pressurizing pressure and the molded powder compact is fired for burning out the resin to obtain a fired body. In the case of using an amorphous alloy powder for the soft magnetic material powder, it is required that the firing temperature is controlled to be a temperature lower than the crystallization starting temperature of the amorphous alloy.

In the case of injection molding, to ensure the molding processibility, it is required to further add and knead a resin powder to and with the soft magnetic material composite powder. The resin to be added may be the same resin in the composite powder or another different resin. The resin to be used for injection molding is preferably a heat resistant resin having a load-deflection temperature defined in JIS K 7191 of 100° C. or higher and examples of the resin include thermoplastic resins exemplified above except polyolefins, polyvinyl alcohols, and polyethylene oxides and the above-mentioned exemplified thermosetting resins. At the time of kneading, in the case of a thermoplastic resin, it is preferable to carry out kneading under the condition of heating at a temperature equal to or higher than the softening point of the resin. Meanwhile, in the case of a thermosetting resin, it is preferable to carry out kneading at a temperature equal to or lower than the decomposition temperature of the resin, preferably at a temperature of 300° C. or lower. In the case of injection molding, to ensure the molding processibility, the content of the resin in the final molded product is preferably 5% by weight or higher.

The composite powder is preferably granulated. If granulation is carried out, due to the effect of the partial melt fusion of the resin even in the inside of the granulated particles, the soft magnetic material powder becomes freely deformable and accordingly, large particles and small particles are densely packed and a high packing density can be maintained. Further, due to the effect of the partial melt fusion of the resin among granulated particles, deformation of the granulated particles is made possible to provide a high packing density. Consequently, the granulated composite powder is provided with a high packing density and high deformability and thus useful for powder compaction.

The granulation can be carried out, as described above, by a mixing/stirring granulation process in which a resin powder is added to and with the soft magnetic material powder having the inorganic insulating layer. However, to make the shape and the particle diameter of the granulated particles uniform, it is preferable to employ a conventionally known method such as a self-granulation method by rolling or a forcible granulation method by spray drying and use the composite powder as a raw material powder.

Embodiment 2

This embodiment relates to another production method of a soft magnetic composite powder. In this embodiment, a composite powder is produced by heating the soft magnetic material powder described in the embodiment 1, an inorganic insulating material, and a resin material at a temperature equal to or higher than the melting point of the resin material and mixing them. It is preferable to use a glass powder as the inorganic insulating material and a resin powder as the resin material. The surface of the soft magnetic material powder can be covered with the resin powder fusion-bonded to the soft magnetic material powder and the glass powder bonded with the resin powder and further the resin powder is fusion-bonded to the surface of the glass powder to give the composite powder.

The particle diameters of the glass powder and the resin powder are smaller than the particle diameter of the soft magnetic material powder and are preferably a half or smaller and for example in the case where the particle diameter of the soft magnetic material powder is less than or equal to 300 μm, 150 μm or 45 μm, the particle diameters of the glass powder and the resin powder are preferably less than or equal to 150 μm, 75 μm or 20 μm, respectively.

The composition of the composite powder is adjusted to contain preferably 0.3 to 10% by weight of the inorganic insulating material, 1 to 10% by weight of the resin material, and the balance of the soft magnetic material powder; more preferably 0.4 to 6% by weight of the inorganic insulating material, 2 to 8% by weight of the resin material, and the balance of the soft magnetic material powder; and even more preferably 0.4 to 6% by weight of the inorganic insulating material, 3 to 8% by weight of the resin material, and the balance of the soft magnetic material powder. Adjustment of the composition of the composite powder makes it possible to partially cover the surface of the soft magnetic material powder with the resin powder fusion-bonded to the glass powder and accordingly the same effect as that in the embodiment 1 can be obtained.

Embodiment 3

This embodiment relates to a production method of a soft magnetic compact. In this embodiment, a soft magnetic material fired body is produced from the composite powder described in embodiment 1 or 2 as a raw material powder by so-called metal injection molding method (MIM). MIM is for degreasing and firing the above-mentioned injection molded body to give the fired body. Conventionally, the strength of the molded body after the degreasing step is so low in MIM as to make the molded body impossible to be used as the soft magnetic material as it is. Further, if the molded body is sintered, the insulation property is decreased and it becomes difficult to obtain a material with good magnetic properties. However, use of the composite material of the present invention for the raw material gives magnetic properties as excellent as those in the case of the above-mentioned powder compaction molding-firing method. In this case, it is preferable for the composite powder for MIM to have a thermal decomposition temperature of the resin in the composite powder equal to or higher than the thermal decomposition temperature of a resin to be added at the time of injection molding (hereinafter, referred to as a resin for MIM). It is because the network of the composite powder in the injection molded body can be maintained to the final stage of degreasing and firing. The degreasing and firing can be carried out in one step.

As the resin for MIM are usable thermoplastic resins having functions of giving plasticity to the raw material powder and strength to the molded body at a normal temperature and for example, one kind of acrylic resins, polyolefin resins, polystyrene resins, and polyimide resins, mixtures of two or more kinds of them, and their copolymers may be used. Practical examples include polyethylene, polypropylene, polystyrene, ethylene-vinyl acetate copolymers, ethylene-ethyl acrylate copolymers, polymethacrylic acid acryl esters, and polyamides.

To improve the degreasing property and fluidity, waxes, plasticizers and the like may be added if necessary.

As the waxes, one kind of or mixtures of two or more kinds of natural waxes such as beeswax, Japan wax, and montan wax and synthetic waxes such as low molecular weight polyethylene, microcrystalline wax, and paraffin wax can be used. The waxes can work also as a plasticizer or a lubricant. Further, if necessary, as a degreasing-promoting agent can be used a sublimation substance such as camphor.

As the plasticizer, di-2-ethylhexyl phthalate, diethyl phthalate, di-n-butyl phthalate and the like can be used. Further, if necessary, higher fatty acids, fatty acid amides, fatty acid esters and the like may be used as the lubricant.

In MIM, at the time of producing the composite powder, addition of the resin can be omitted. That is, the fired body can be obtained by adding the resin material to the soft magnetic composite powder containing the soft magnetic material powder whose surface is covered with the electrical insulating material containing at least the inorganic insulating material, kneading the mixture, injection molding the mixture, and degreasing and firing the injection-molded body.

The molded body of the soft magnetic composite powder as described in this embodiment can be used not only for a magnetic core but also for an electromagnetic wave absorber. That is, an electromagnetic wave absorber containing a soft magnetic material having a high magnetic permeability can suppress reflected wave and transmitted wave by absorbing the electromagnetic wave. Conventionally, an electromagnetic wave absorber to be used is obtained by dispersing an electromagnetic wave absorption material in a matrix of such as a resin or rubber and molding the mixture by extrusion molding or press-molding, however it is not easy to pack the electromagnetic wave absorption material at a high density and accordingly, sufficiently high electromagnetic wave absorption property has not yet been obtained. However, use of the soft magnetic composite powder of the present invention improves the packing density of the soft magnetic material and accordingly improves the electromagnetic wave absorption property.

The molded body of the soft magnetic composite powder described in the embodiment can be used as the magnetic shielding material. Since the soft magnetic material having a high magnetic permeability is used and the packing density of the soft magnetic material to be dispersed in the matrix can be improved, it is made possible to improve the magnetic shielding properties.

Hereinafter, the present invention will be described more in detail with reference to Examples.

EXAMPLE 1

Production 1 of Fired Body by Powder Compaction Molding Method (Production of Soft Magnetic Composite Powder)

An amorphous alloy of $(Fe_{0.97}Cr_{0.03})_{76}(S_{i0.5}B_{0.2})_{22}C_2$ covered with a low melting point glass powder ($P_2O_5$ 60 to 80%, $Al_2O_3$ 10% or less, ZnO 10 to 20%, $Li_2O$ 10% or less, and $Na_2O$ 10% or less; particle diameter 40 μm or smaller) by powder coating method was used as a soft magnetic material powder. An epoxy resin which is a thermosetting resin and polyethylene oxide which is a thermoplastic resin were used as a resin powder and zinc stearate was used as a lubricant. The Fe—Cr—Si—B—C type amorphous alloy and the resin power to be used were sieved to adjust the particle diameter 45 μm or smaller.

The Fe—Cr—Si—B—C type amorphous alloy covered with the low melting point glass was mixed with the epoxy resin powder, polyethylene oxide (PEO) powder, and zinc stearate were added at ratios to give the compositions as shown in Table 1 and mixed by a ball mill at a temperature of 112° C. to give composite powders.

(Production of Molded Body)

The composite powders with different resin powder contents were packed in a die and press-molded at a prescribed pressure to obtain powder compacts and the respective powder compacts were fired at 480° C. for 15 minutes in atmospheric air to burn out the resins and obtain fired bodies (diameter 10 mm, inner diameter 5 mm, and thickness 5 mm) (samples 1 to 5).

(Evaluation of the Continuous Moldability)

The continuous moldability was evaluated by the following method. That is, at the time of automatic operation of the press-molding, the powder compacts were kicked out by protruding a lower punch and then protruding a kick mechanism. At the time of automatic operation, the easiness of taking out the powder compacts and retention of the shapes of the powder compacts in relation to the speed of the automatic operation were measured. The powder compacts which made automatic operation possible at a speed of 20 pieces/minute were marked with ◎: those which made automatic operation possible at a speed of 15 pieces/minute were marked with ○: those which made automatic operation possible at a speed of 10 pieces/minute were marked with Δ: and those which were difficult to be subjected to automatic operation, that is, they were needed to take out manually, were marked with X.

(Measurement of Magnetic Permeability)

The magnetic permeability was measured according to JIS C2561.

The results are shown on the basis of comparison with sample 1 (magnetic permeability of about 60 at 1 MHz) employed as a standard. Those which had −5% or higher than the value of the sample 1 were marked with ◎: those which had −10% or higher than the value of the sample 1 were marked with ○: those which had −15% or higher than the value of the sample 1 were marked with Δ: and those which had −15% or lower than the value of the sample 1 were marked with X.

COMPARATIVE EXAMPLE 1

The surfaces of Fe—Cr—Si—B—C type amorphous alloys adjusted to have particle diameters of less than or equal to 150 μm, 75 μm or 45 μm by sieves were coated with low melting point glass in the same manner as Example 1. Next, the epoxy resin powder, polyethylene oxide powder, and zinc stearate were added at ratios to give the compositions as shown in Table 1 and mixed at a room temperature by a ball mill to obtain composite powders. It was tried to mold the composite powders in the same manner as Example 1, however high press pressure was required and molding was difficult. Therefore, the pressure sufficient to give the shape was regarded as the molding pressure (samples 6 to 8). The magnetic permeability measurement was impossible.

COMPARATIVE EXAMPLE 2

The Fe—Cr—Si—B—C type amorphous alloy were used and the epoxy resin powder, polyethylene oxide powder, and zinc stearate were added at ratios to give the composition as shown in Table 1 and mixed at a temperature of 112° C. by a ball mill to obtain composite powders. The composite powder was treated in the same manner as Example 1 to obtain a powder compact molded body (sample 9).

TABLE 1

| Sample No. | Soft magnetic material powder: Content (wt. %) | Soft magnetic material powder: Sieved particle diameter (μm) | Content of low melting point glass (wt. %) | Content of resin (wt. %): Thermosetting resin | Content of resin (wt. %): PEO | Content of zinc stearate (wt. %) | Fusion treatment |
|---|---|---|---|---|---|---|---|
| 1 | 96.9 | −45 | 0.5 | 1.5 | 0.8 | 0.3 | Conducted |
| 2 | 95.4 | −45 | 0.5 | 3.0 | 0.8 | 0.3 | Conducted |
| 3 | 91.4 | −45 | 0.5 | 7.0 | 0.8 | 0.3 | Conducted |
| 4 | 89.4 | −45 | 0.5 | 9.0 | 0.8 | 0.3 | Conducted |
| 5 | 87.4 | −45 | 0.5 | 11.0 | 0.8 | 0.3 | Conducted |
| 6 | 96.4 | −150 | 0.5 | 2.0 | 0.8 | 0.3 | Not conducted |
| 7 | 96.4 | −75 | 0.5 | 2.0 | 0.8 | 0.3 | Not conducted |
| 8 | 96.4 | −45 | 0.5 | 2.0 | 0.8 | 0.3 | Not conducted |
| 9 | 95.9 | −45 | 0 | 3.0 | 0.8 | 0.3 | Conducted |

TABLE 2

| Sample No. | Molding pressure (MPa) | Continuous moldability | Magnetic permeability |
|---|---|---|---|
| 1 | 600 to 700 | ◎ | ◎ |
| 2 | 600 to 700 | ○ | ◎ |
| 3 | 700 to 900 | Δ | ○ |
| 4 | 700 to 900 | Δ | Δ |
| 5 | 600 to 800 | X | Measurement impossible |

TABLE 2-continued

| Sample No. | Molding pressure (MPa) | Continuous moldability | Magnetic permeability |
|---|---|---|---|
| 6 | 1800 | X | Measurement impossible |
| 7 | 1200 | X | Measurement impossible |
| 8 | 1200 | X | Measurement impossible |
| 9 | 500 to 600 | ◎ | X |

(Results of Example 1)

As compared with the samples 6 to 8, samples 1 to 4 could be molded at considerably decreased molding pressure and had good magnetic permeability. It is supposedly attributed to that in the case of the samples 1 to 4, the resin powder fusion-bonded to the glass layer decreases the friction among the particles of the soft magnetic material powder and makes the soft magnetic material powder move easily and increases the packing density.

However, with respect to the sample 5 having the resin content exceeding 10 wt. %, the sample was inferior in the fluidity and difficult to be packed in a die and had a low packing density and molding by automatic operation was impossible. Further, unless the heating speed was controlled to be slow at the time of firing, the fired body was broken owing to the pressure of the gas evolved by decomposing the resin. Even if the heating speed was made slow, since the strength was too low to wind a coil, the magnetic permeability measurement was impossible.

With respect to the sample 9 with no glass coating, although molding was possible at a low molding pressure owing to addition of the resin, the magnetic permeability was low. It is supposedly attributed to that because of the absence of the glass layer, the insulation among the particles of the soft magnetic material powder is insufficient.

Figure 2:
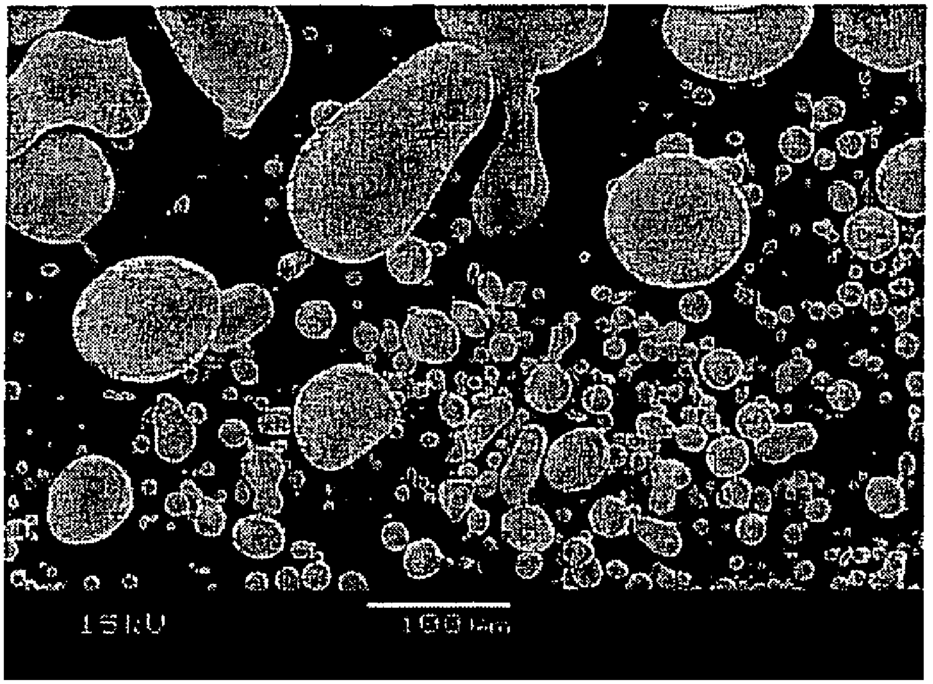
FIG. 2 is a SEM photograph showing the shape of a soft magnetic material powder covered with a glass coating and used for the present invention.

FIG. 1 is a SEM photograph of a composite powder used for producing the sample 1 and the composite powder is a glass-coated amorphous alloy to which a resin powder is fusion-bonded as shown in the SEM photograph of FIG. 2. As being made clear from the photographs, the composite powder of the invention is granulated and has a structure that the coarse particles and fine particles of the amorphous alloy are so densely packed as to fill voids among the particles.

EXAMPLE 2

Production 2 of Fired Body by Powder Compact Molding Method (Production of Soft Magnetic Composite Powder)

The low melting point glass powder and the epoxy resin powder employed in Example 1 were added to the Fe—Cr—Si—B—C type amorphous alloy employed in Example 1 at ratios to give the compositions as shown in Table 2 and mixed at a temperature of 112° C. by a ball mill to obtain composite powders (hereinafter, called as three-components-mixing method). The amorphous alloy powder and the epoxy resin were adjusted to have prescribed particle sizes by sieves. The obtained composite powders were subjected to the treatment in the same manner as Example 1 to obtain fired bodies (samples 10 to 19).

TABLE 3

| Sample No. | Soft magnetic material powder Content (wt. %) | Soft magnetic material powder Sieved particle diameter (μm) | Low melting point glass Content (wt. %) | Low melting point glass Sieved particle diameter (μm) | Resin (thermosetting resin) Content (wt. %) | Resin (thermosetting resin) Sieved particle diameter (μm) |
|---|---|---|---|---|---|---|
| 10 | 97.5 | −150 | 0.5 | −150 | 2.0 | −150 |
| 11 | 97.5 | −150 | 0.5 | −75 | 2.0 | −75 |
| 12 | 97.5 | −150 | 0.5 | −45 | 2.0 | −45 |
| 13 | 97.5 | −45 | 0.5 | −45 | 2.0 | −45 |
| 14 | 97.5 | −45 | 0.5 | −45 | 2.0 | −45 |
| 15 | 97.5 | −45 | 0.5 | −20 | 2.0 | −20 |
| 16 | 94 | −150 | 3.0 | −45 | 3.0 | −45 |
| 17 | 91 | −150 | 6.0 | −45 | 3.0 | −45 |
| 18 | 83 | −150 | 6.0 | −45 | 8.0 | −45 |
| 19 | 80 | −150 | 6.0 | −45 | 11.0 | −45 |

TABLE 4

| Sample No. | Molding pressure (MPa) | Continuous moldability | Magnetic permeability |
|---|---|---|---|
| 10 | 600 to 700 | ○ | Δ |
| 11 | 500 to 600 | ◎ | ◎ |
| 12 | 500 to 600 | ◎ | ◎ |
| 13 | 700 to 900 | ○ | Δ |
| 14 | 600 to 700 | ○ | ○ |
| 15 | 500 to 600 | ○ | ◎ |
| 16 | 500 to 600 | ◎ | ○ |
| 17 | 600 to 700 | ◎ | ○ |
| 18 | 700 to 900 | Δ | ○ |
| 19 | 600 to 800 | X | X |

(Results of Example 2)

Also in the case of producing the composite powders by the three-components-mixing method, as shown in Table 4, the molding pressure could remarkably be lowered as compared with that by the method of Comparative Example 1 and the continuous moldability and magnetic permeability were excellent. However, with respect to the sample 19 having the resin content exceeding 10 wt. %, the sample was inferior in the fluidity and difficult to be packed in a die and had a low packing density and molding by automatic operation was impossible. Further, unless the heating speed was controlled to be slow at the time of firing, the fired body was broken owing to the pressure of the gas evolved by decomposing the resin. Even if the heating speed was made slow, since the strength was too low to wind a coil, the magnetic permeability measurement was impossible.

EXAMPLE 3

Production of Injection-Molded Body by Injection Molding Method (Production of Soft Magnetic Composite Powder)

The same soft magnetic material powder and low melting point glass powder as those of Example 1 were used. A polyamide which is a thermoplastic resin was used as the resin powder. The polyamide to be used was adjusted to have a particle diameter of 45 μm or smaller by a sieve. The polyamide resin powder was added in a proper amount to control the content of the resin at 2 wt. % to the Fe—Cr—Si—B—C type amorphous alloy covered with the low melting point glass by a powder coating apparatus and the mixture was mixed at a temperature of 250° C. by a ball mill to obtain a composite powder.

(Injection Molding)

The polyamide resin was further added to the produced composite powders to give the compositions shown in Table 5 and the mixed powders were loaded to a kneading and extruding apparatus to knead the mixtures and produce pellets for molding. The pellets for molding were supplied to an injection molding apparatus and injection-molded at a cylinder temperature of 290° C., injection pressure of 200 MPa, and a die temperature of 100° C. to obtain injection molded bodies (samples 20 to 22). The sample shape was regarded as T-80.

(Evaluation of DC Bias Property)

The DC bias property was evaluated based on the ratio of the inductance at the time of superposing 14A to the inductance at the time of superposing DC 0 A(ampere). That is, those having the ratio of 97% or higher were marked with ◎: those having the ratio of 94% or higher were marked with ○: those having the ratio of 90% or higher were marked with Δ: and those having the ratio of 90% or lower were marked with X.

COMPARATIVE EXAMPLE 3

The Fe—Cr—Si—B—C type amorphous alloy having no glass coating was used and injection molded bodies (sample 23 and 24) were obtained by adding the amide resin powder to amorphous alloy in the compositions as shown in Table 5 and injection molding obtained powder mixtures by the same method as Example 3.

TABLE 5

| Sample No. | Soft magnetic material powder: Content (wt. %) | Soft magnetic material powder: Sieved particle diameter (μm) | Content of low melting point glass (wt. %) | Content of resin (wt. %) |
|---|---|---|---|---|
| 20 | 87.5 | −45 | 0.5 | 12 |
| 21 | 79.5 | −45 | 0.5 | 20 |
| 22 | 69.5 | −45 | 0.5 | 30 |
| 23 | 87.5 | −45 | 0.5 | 12 |
| 24 | 69.5 | −45 | 0.5 | 30 |

TABLE 6

| Sample No. | DC bias property | Continuous moldability | Magnetic permeability |
|---|---|---|---|
| 20 | ○ | ○ | ◎ |
| 21 | ○ | ◎ | ○ |
| 22 | ◎ | ◎ | Δ |
| 23 | X | ○ | ◎ |
| 24 | Δ | ◎ | ○ |

(Results of Example 3)

In the case of the samples 20 to 22 using the composite powders, the samples were excellent in both continuous moldability and magnetic property. On the other hand, with respect to the samples 23 and 24 using the mixed powders, although the continuous moldability and magnetic permeability were good, the DC bias property was not good. That, is in the case of the samples 23 and 24, the magnetic permeability tended to be decreased when the DC was superposed on AC. It is supposedly attributed to that the covering of the surface of the soft magnetic material powder by the glass powder or the resin powder was insufficient in the case of the samples 23 and 24 and the electric insulating property among the particles of the soft magnetic material powder was not sufficiently ensured.

EXAMPLE 4

Production of Fired Body by Metal Injection Molding Method (MIM)

(Production of Soft Magnetic Composite Powder)

The same soft magnetic material powder and low melting point glass powder as those of Example 3 were used. A polyamide which is a thermoplastic resin was used as the resin powder. The polyamide to be used was adjusted to have a particle diameter of 45 μm or smaller by a sieve. The polyamide resin powder was added in a proper amount to control the content of the resin at 2 wt. % to the Fe—Cr—Si—B—C type amorphous alloy covered with the low melting point glass by a powder coating apparatus and the mixture was mixed at a temperature of 250° C. by a ball mill to obtain a composite powder. For comparison, a composite powder containing no polyamide resin powder was also produced.

(Injection Molding)

The resin powder (paraffin wax/polyethylene=75/25 (weight ratio)) for MIM was further added to the produced composite powders to give the compositions shown in Table 7 and the mixed powders were loaded to a kneading and extruding apparatus to knead the mixtures and produce pellets for molding. The pellets for molding were supplied to an injection molding apparatus and injection-molded at a cylinder temperature of 290° C., injection pressure of 200 MPa, and a die temperature of 100° C. to obtain injection molded bodies. The sample shape was regarded as T-80.

TABLE 7

| Sample No. | Soft magnetic material powder Content (wt. %) | Soft magnetic material powder Sieved particle diameter (μm) | Content of low melting point glass (wt. %) | Content of resin (wt. %) |
|---|---|---|---|---|
| 25 | 79.5 | −45 | 0.5 | 20*[1] |
| 26 | 79.5 | −45 | 0.5 | 20*[2] |

*[1]The content of the resin was 3% by weight of the polyamide resin and 17% by weight of the resin for MIM.
*[2]The content of the resin was 20% by weight of the resin for MIM.

(Degreasing and Firing)

The obtained injection-molded bodies were degreased and fired in atmospheric air at a heating speed shown in Table 8 below to obtain fired bodies (sample 25).

TABLE 8

| | Temperature range | Heating speed (° C./hr) |
|---|---|---|
| 1 | From a normal temperature to 200° C. | 2 |
| 2 | 200 to 350° C. | 5 |
| 3 | 350 to 450° C. | 8 |
| 4 | 450° C. | Kept for 4 hours |
| 5 | Spontaneous cooling | — |

(Evaluation of DC Bias Property)

The DC bias property was evaluated based on the ratio of the inductance at the time of superposing 14A to the inductance at the time of superposing DC 0 A. That is, those having the ratio of 97% or higher were marked with ◎: those having the ratio of 94% or higher were marked with ○: those having the ratio of 90% or higher were marked with Δ: and those having the ratio of 90% or lower were marked with X.

(Results of Example 4)

As shown in Table 9, the sample 25 was excellent in DC bias property, continuous moldability and magnetic permeability. In this case, the sample 26 using the composite powder containing no polyamide resin was also found having relatively good properties.

TABLE 9

| Sample No. | DC bias property | Continuous moldability | Magnetic permeability |
|---|---|---|---|
| 25 | ○ | ○ | ○ |
| 26 | Δ | ○ | ○ |

As described above, since a soft magnetic composite powder of the invention is composed of a soft magnetic material powder covered with an electrical insulating material containing at least an inorganic insulating material in the surface and a resin material fusion-bonded to the surface of the inorganic insulating material so as to partially cover the surface of the soft magnetic material powder, the friction among the particles of the soft magnetic material powder can be decreased at the time of molding and the molding pressure can be decreased to improve the processibility and the packed density can be improved. Further, since the electric insulation property among the particles of the soft magnetic material powder is ensured by the electrical insulating material, a high magnetic permeability can be obtained. The soft magnetic composite powder of the present invention is preferable to be used not only for a magnetic core of a transformer for high frequency and choke coil but also for an electromagnetic wave absorber and a magnetic shield.

The invention claimed is:

1. A soft magnetic composite powder used for producing a soft magnetic compact, wherein the soft magnetic composite powder comprises a soft magnetic material powder having a surface covered with an electrical insulating material comprising at least an inorganic insulating material, and wherein a resin material is fusion-bonded to a surface of the inorganic insulating material so as to partially cover the surface of the soft magnetic material powder.

2. The soft magnetic composite powder according to claim 1, wherein the surface of the soft magnetic material powder is covered with an inorganic insulating layer containing the inorganic insulating material, and wherein the resin material is fusion-bonded to the inorganic insulating layer.

3. The soft magnetic composite powder according to claim 2, wherein the resin material is a particulate resin material having a particle diameter of a half or smaller than that of the soft magnetic material powder.

4. The soft magnetic composite powder according to claim 2, wherein the composite powder comprises 0.3 to 6% by weight of the inorganic insulating material, 3 to 8% by weight of the resin material, and the balance of the soft magnetic material powder.

5. The soft magnetic composite powder according to claim 1, wherein the electrical insulating material contains the resin material.

6. The soft magnetic composite powder according to claim 1, wherein the inorganic insulating material is a glass material.

7. The soft magnetic composite powder according to claim 1, wherein the soft magnetic material powder is an amorphous soft magnetic alloy.

8. The soft magnetic composite powder according to claim 1, wherein the soft magnetic composite powder is granulated with the resin material.

9. The soft magnetic composite powder according to claim 1, wherein the inorganic insulating material is a glass material, and wherein the particle diameters of the glass material and the resin material are a half or smaller than that of the soft magnetic material powder, and wherein the composite powder comprises 0.3 to 10% by weight of the glass material, 3 to 8% by weight of the resin material, and the balance of the soft magnetic material powder.

10. A method for producing a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder, the method comprising: covering the soft magnetic material powder with the electrical insulating material; mixing the soft magnetic material powder with the resin material; and fusing the resin material to the inorganic insulating material.

11. The method according to claim 10, wherein the inorganic insulating material is a glass material, and further comprising forming a glass layer by fusing the glass material to the surface of the soft magnetic material powder; and then fusing the resin material to the glass layer.

12. The method according to claim 10, wherein the glass material is a low melting point glass having a softening point of about 550° C. or lower.

13. The method according to claim 10, wherein the resin material is a particulate resin material having a particle diameter of half or smaller than that of the soft magnetic material powder.

14. The method according to claim 10, wherein the composite powder comprises 0.3 to 6% by weight of the inorganic insulating material, 3 to 8% by weight of the resin material, and the balance of the soft magnetic material powder.

15. A method for producing a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder, the method comprising: mixing the soft magnetic material powder, the inorganic insulating material and the resin material, thereby covering the surface of the soft magnetic material powder with the inorganic insulating material and the resin material and fusing the resin material to the inorganic insulating material.

16. The method according to claim 15, wherein the inorganic insulating material is a particulate glass material, the resin material is a particulate resin material, and the particle diameters of the glass material and the resin material are a half or smaller than that of the soft magnetic material powder, and wherein the composite powder comprises 0.3 to 10% by weight of the glass material, 3 to 8% by weight of the resin material, and the balance of the soft magnetic material powder.

17. A method for producing a soft magnetic compact, the method comprising: filling a die with a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder; pressurizing the powder for obtaining a pressured powder, and firing the pressurized powder for obtaining a fired body.

18. A method for producing a soft magnetic compact, the method comprising: adding a resin material to a soft magnetic composite powder comprising a soft magnetic material powder whose surface is covered with an electrical insulating material containing at least an inorganic insulating material and a resin material fusion-bonded to the surface of the inorganic insulating material so as to partially cover the surface of the soft magnetic material powder; and kneading the mixture, thereby obtaining an injection-molded body of the kneaded mixture.

* * * * *